United States Patent [19]

Höglund

[11] Patent Number: 5,051,167

[45] Date of Patent: Sep. 24, 1991

[54] APPARATUS FOR SCREENING A SUSPENSION OF FIBROUS CELLULOSE MATERIAL

[75] Inventor: Ronny Höglund, Skoghall, Sweden

[73] Assignee: Kamyr AB, Karlstad, Sweden

[21] Appl. No.: 461,098

[22] Filed: Jan. 4, 1990

[30] Foreign Application Priority Data

Feb. 22, 1989 [SE] Sweden .................. 8900608

[51] Int. Cl.$^5$ .................. D21D 5/00; B07B 1/04
[52] U.S. Cl. .................. 209/270; 209/273; 209/288; 209/300
[58] Field of Search ........... 209/270, 273, 288, 291, 209/303, 305, 406, 410, 411, 664, 285, 286, 393, 394, 268, 385

[56] References Cited

U.S. PATENT DOCUMENTS

| | | | |
|---|---|---|---|
| 1,185,794 | 6/1916 | Haug | 209/270 |
| 1,187,731 | 6/1916 | Haug | 209/270 |
| 2,796,987 | 6/1957 | Meyer | 209/664 X |
| 4,303,207 | 12/1981 | Lindstrom | 209/271 |

FOREIGN PATENT DOCUMENTS 492316  1/1976  U.S.S.R. .................. 209/406

Primary Examiner—Donald T. Hajec
Attorney, Agent, or Firm—Cushman, Darby & Cushman

[57] ABSTRACT

An apparatus for screening a suspension of fibrous cellulose material containing undigested wood comprising a shaft rotating in a housing and an elongate screen disposed in a screening chamber. This screen comprises a stationary screening member and a rotating screening member connected to the shaft. Each of the screening members comprises a plurality of parallel rings disposed with predetermined axial distance from each other to form circumferential openings, the rings of the stationary screening member and the rotating screening member being arranged to partially close each other's openings between the rings to define circumferential screening gaps therebetween. According to the invention the stationary screening member is in the form of a unitary body rigidly connected to the housing so that at least circumferential movement is prevented. The rotating screening member is likewise in the form of a unitary body but it is connected to the shaft for common rotation therewith. The apparatus enables digested pulp to be screened without dilution.

11 Claims, 2 Drawing Sheets

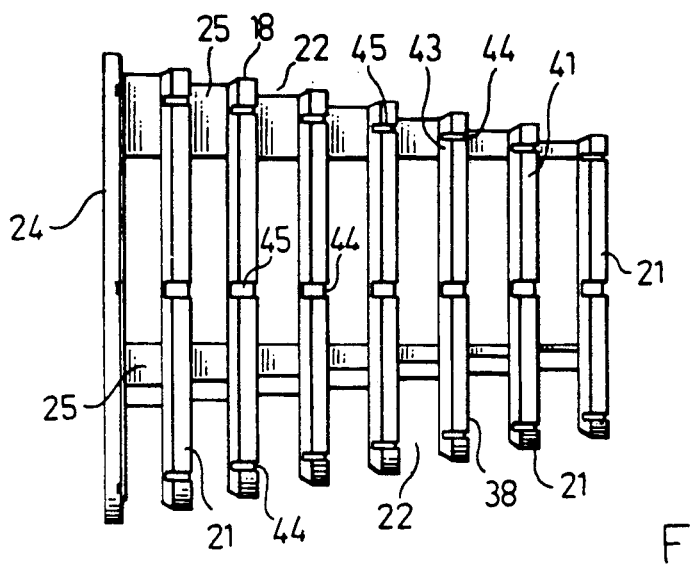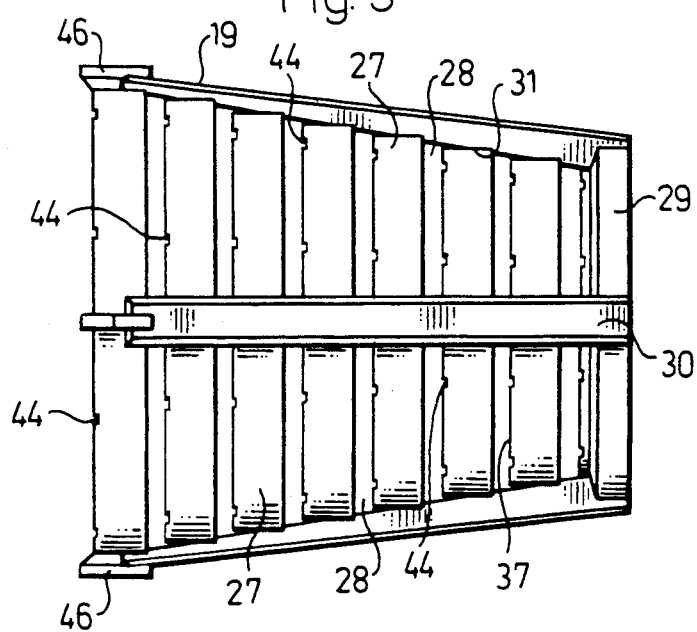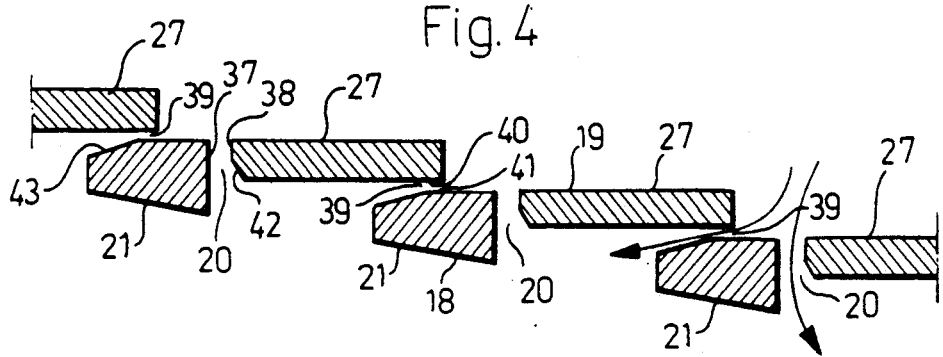

APPARATUS FOR SCREENING A SUSPENSION OF FIBROUS CELLULOSE MATERIAL

FIELD AND BACKGROUND OF THE INVENTION

The present invention relates to an apparatus for screening a suspension of fibrous cellulose material containing undigested wood.

U.S. Pat. No. 1,185,794 describes a screening apparatus of centrifugal type having a screen consisting of a rotating portion and a stationary portion. The rotatable portion of the screen is constructed from a series of spiders 13 with hubs, rigidly mounted to a driving through shaft 7. The spiders are provided with peripheral portions 15 which are narrower than the hub 14 so that two adjacent spiders 13 are separated by a circumferential opening. Each such opening is closed partially by the inner edge 16 of a stationary, flat ring 17. The stationary portion of the screen consists of a series of such flat rings 17 rigidly mounted in the housing of the screening apparatus by means of a plurality of rods 18. A screening slot or opening is formed between a side wall of each spider 13 located at said peripheral, narrower portion 15, and an opposite side wall of each stationary ring 17. Inside said peripheral portions 15 the rotating spiders 13 are provided with openings 20 through which the fiber suspension to be screened flows in order to reach said screening openings. The screening apparatus according to said patent specification is complicated and thus also expensive to manufacture because of the many spiders and rings which must be alternately fitted extremely accurately one after the other, which is a time-consuming process, so as to form a stationary and a rotating screening portion when finally assembled in the housing. Dismantling the screening portions is equally time-consuming and complicated. The screening gaps or slots are determined from the start by the dimensioning of spiders and rings and the structure does not allow for alteration in one and the same screening apparatus. Neither can the screening gaps be varied in two different screening apparatuses unless two series of spiders and rings with different axial dimensions are manufactured. Furthermore, the structure of the spiders, with a large number of small openings to allow the fiber suspension to pass results in unfavourable flow so that material catches on the many surfaces and edges of the plates, entailing clogging and stops in operation which may be protracted in view of the difficulty in dismantling the spiders and rings one by one. However, the most serious deficiency with the known screening apparatus from the operational point of view is that the screening gaps are charged by knots and other undigested wood in the fiber suspension since the apparatus is of centrifugal type, i.e. the material is fed from the inside, outwards. The knots and other undigested wood are therefore thrown out towards the screening gaps by the centrifugal force, thereby clogging the gaps. In practice, therefore, the screening apparatus described in U.S. Pat. No. 1,185,794 cannot be used for coarse screening to remove coarse reject from a fiber suspension.

The coarse screening apparatus used hitherto for separating coarse reject from digested pulp can only function satisfactorily if the digested pulp is diluted to considerably lower concentrations. The pulp must then usually be re-thickened in the subsequent treatment stage, particularly if pulp of medium consistency (about 6-15%) is utilized.

A uniform fiber line with respect to the fiber concentration is required in the pulp industry so as to avoid, as far as possible, time-consuming and cost-increasing dilution and thickening between the various treatment stages.

SUMMARY OF THE INVENTION

The object of the present invention is to provide an improved screening apparatus which to a great extent reduces the drawbacks of the known screening apparatuses and enables pulp from the digester to be screened without it having to be diluted to lower concentrations. A uniform fiber line can thus be obtained, where pulp of medium consistency (about 6-15%) can be treated continuously the pulp being maintained at medium consistency throughout.

The invention relates to an apparatus for screening a suspension of fibrous cellulose material containing undigested wood, said apparatus comprising a housing with a shaft rotating therein and an elongate screening means disposed in a screening chamber, said screening means comprising a stationary screening member and a rotating screening member connected to said shaft, each of said screening members comprising a plurality of parallel rings disposed with predetermined axial distance from each other to form circumferential openings, the rings of the stationary screening member and the rotating screening member being arranged to partially close each other's openings between the rings to define circumferential screening gaps therebetween, said stationary screening member having the form of a unitary body rigidly connected to the housing so that at least circumferential movement is prevented, and said rotating screening member having the form of a unitary body connected to said shaft for common rotation therewith.

BRIEF DESCRIPTION OF THE DRAWINGS

The invention will be described further in the following, with reference to the accompanying drawings.

FIG. 2 is a lateral view of a stationary screening member of the screening means.

FIG. 3 is a lateral view of a rotating screening member of the screening means.

FIG. 4 is a longitudinal section of a portion of the screening means.

DESCRIPTION OF ILLUSTRATED EMBODIMENT

Figure 1:
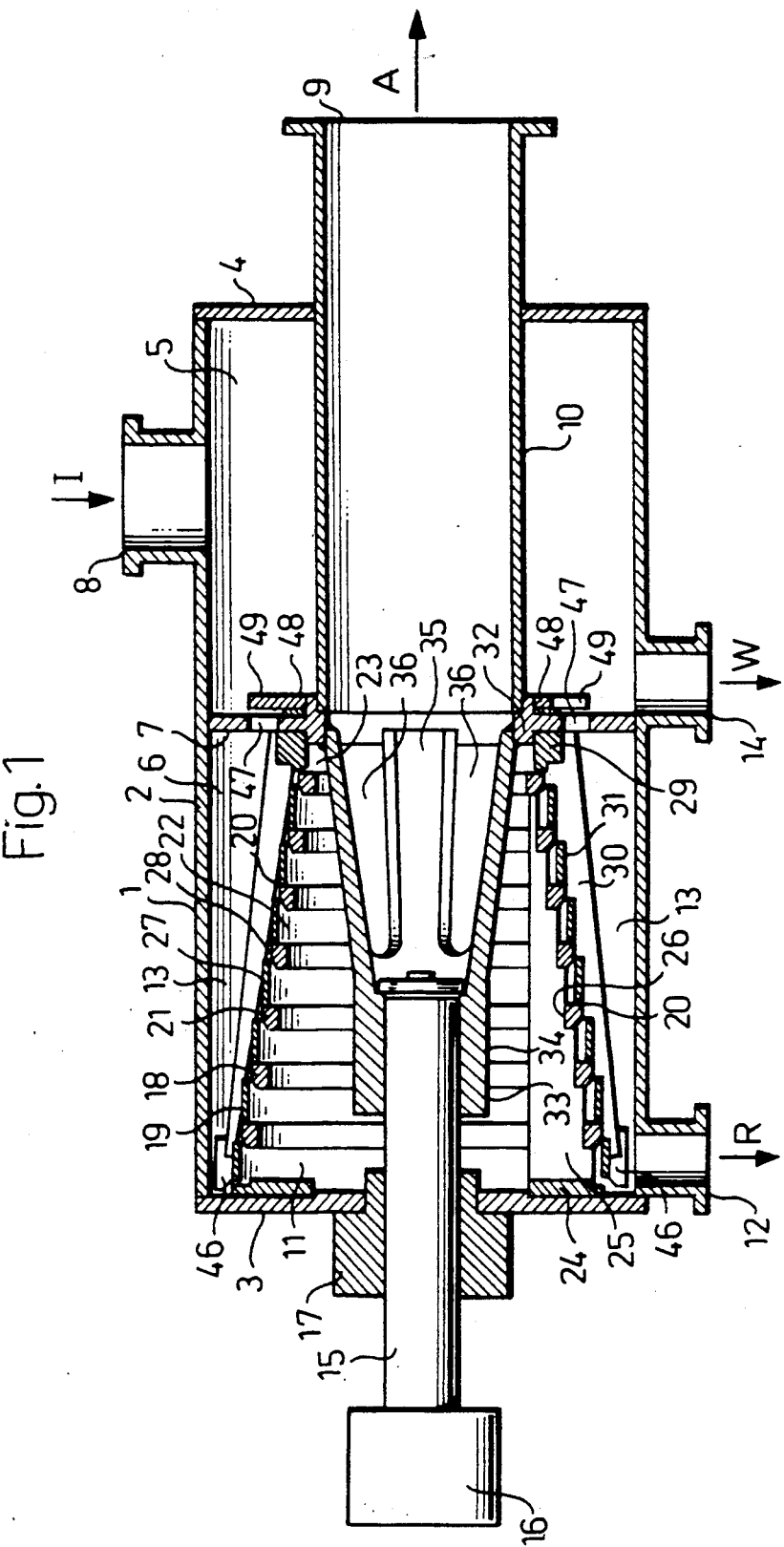
FIG. 1 shows schematically in longitudinal section a screening apparatus according to a preferred embodiment of the invention.

Referring to FIG. 1, a screening apparatus is schematically illustrated therein for screening a suspension of a fibrous cellulose material containing undigested wood. The screening apparatus, thus primarily constituting a coarse screening apparatus, comprises an elongate housing 1 substantially formed by an outer, cylindrical wall 2 and two end walls 3, 4. The housing 1 contains an inject chamber 5 and a screening chamber 6, said chambers being separated by an annular partition 7 secured to the inside of the cylinder wall 2. The screening apparatus has a radial inlet 8 for the fiber suspension to be screened, i.e. the inject I, said inlet 8 being consequently connected to the inject chamber 5. Further, the apparatus has an axial outlet 9 for the finer fraction screened from the fiber suspension, i.e. the accept A. The outlet 9 constitutes an extension of a pipe connection 10 extending centrally from an inner space 11 of the screening chamber 6, through the inject chamber 5 and through the end wall 4. The fraction of the fiber suspension remaining after screening, i.e. the reject R, is removed through a radial outlet 12, connected to an outer space 13 of the screening chamber 6 and located in the vicinity of the end wall 3, i.e. at the end of the screening chamber 6 facing away from the inject chamber 5. Furthermore, the screening apparatus is provided with a radial outlet 14 for undesired parts in the form of waste W in the fiber suspension, such as scrap, stones, sand and similar solid impurities. The outlet 14 is connected to the inject chamber 5 and located close to the annular partition 7. A horizontal, rotatable shaft 15 extends through the end wall 3 into the screening chamber 6. The shaft 15 is driven by a motor 16 and is journalled in a bearing unit 17 with sealing means at the end wall 3 to provide the necessary seal between housing 1 and shaft 15.

Further, the screening apparatus comprises an elongate, i.e. axially extending screening means formed by two separate screening members 18, 19, one of which being stationary and the other movable. The stationary screening member may be termed a stator while the movable screening member may be termed a rotor. In the preferred embodiment shown the screening means is shaped as a truncated cone, which becomes narrower in the direction to the inject chamber 5 and is provided with a plurality of parallel, circumferential screening gaps or slots 20, disposed axially one after the other to permit the flow of fiber suspension from the outer screening space 13 to the inner screening space 11.

The stator 18 comprises a plurality of shape permanent rings 21, disposed with predetermined, uniform axial distance from each other to form circumferential openings 22 therebetween. The stator rings 21 increase in diameter seen in the direction from the inject chamber 5, the smallest stator ring being located a small, predetermined distance from the partition 7 so that a space 23 is formed therebetween. The stator includes an assembly member for its assembly in the screening chamber 6. In the preferred embodiment shown the assembly member consists of a flange 24 disposed at the base or end of the stator having the largest diameter and being parallel to the stator rings 21. The stator 18 is secured by means of the flange 24 to the inside of the end wall 3, as shown, or to a special anchoring element located in the vicinity of the end wall 3 and supported via bearings by the shaft 15, but with no transmission of movement. The flange 24 also acts as a support member for the stator rings 21 by means of three connection elements distributed evenly around the circumference, in the form of arms 25, each of which being provided with a plurality of shoulders 26 being parallel and forming rests for the stator rings 21. The arms 25 permanently connected to the flange 24 and stator rings 21 extend on the inside of the stator rings 21, along the central axis of the screening apparatus. The permanent connections are suitably achieved by welding. Like the stator rings 21, the flange 24 furthermore has a gap-forming function. The stator 18 thus forms a unitary assembly body which can quickly and simply be mounted onto the end wall 3 or on a special stationary anchoring element if such is used. In the embodiment shown, the stator is anchored so that movement is prevented both in circumferential and longitudinal direction.

The rotor 19 likewise comprises a plurality of shape permanent rings 27 disposed with predetermined, uniform axial distance from each other to form circumferential openings 28 therebetween. The rotor rings 27 have the same pitch as the stator rings 21 and increase in diameter seen in the direction from the inject chamber 5. The rotor 19 likewise includes an assembly member for its assembly in the screening chamber 6. In the preferred embodiment shown this member consists of a flange 29 disposed at the top or end of the rotor having the smallest diameter and being parallel to the rotor rings 27. The rotor 19 is secured by means of the flange 29 to the shaft 15 via a suitable intermediate piece as will be described below. The flange 29 also acts as a support member for the rotor rings 27 by means of four connection elements distributed evenly around the circumference, in the form of arms 30, each of which being provided with a plurality of shoulders 31 being parallel and forming rests for the rotor rings 27. The arms 30 connected to the flange 29 and rotor rings 27 extend on the outside of the rotor rings, along the central axis of the screening apparatus. The arms suitably have bevelled edges and as little extension in radial and transverse direction as possible. The permanent connections are suitably achieved by welding. Like the rotor rings 27, the flange 29 furthermore has a gap-forming function. The rotor 19 thus forms a unitary assembly body which can quickly and simply be mounted onto said intermediate piece and shaft 15 for common rotation therewith. In the embodiment shown the intermediate piece comprises an annular attachment member 32 and a hub 33, the hub being provided with a front portion 34 surrounding the inner, end portion of the shaft 15, and a rear portion 35 extending backwards from the shaft 15. The rear portion 35 of the hub 33 extends to the partition 7 between the inject chamber 5 and the screening chamber 6. The attachment ring 32 is suitably welded to the hub 33 and is located in said space 23 at the end of the stator 18 to be detachably connected to the rotor flange 29 by means of a bolted joint. The rear portion 35 of the hub 33 is provided with a plurality of longitudinal openings 36 connecting the inner screening space 11 of the screening chamber 6 to the outlet 9 for the accept via the central pipe connection 10. The attachment member 32 rotates in relation to the pipe connection 10 and suitable sealing and journalling means are therefore disposed between these parts.

The radial extension of the stator and rotor rings 21, 27 is small and limited, so that the inner screening space 11 is as large as possible, or sufficiently large for a given dimension of the screening means.

In the preferred embodiment of the invention shown the screening members 18, 19 are shaped as truncated cones and are shaped and adapted to each other so that each rotor ring 27 has the same outer diameter, as shown (or alternatively slightly larger) as (than) the larger one of the two adjacent stator rings 21. As can be seen in FIG. 4, the screening gap or slot 20 will then be defined by two opposite, parallel lateral surfaces 37, 38 of the stator ring 21 and the rotor ring 27, respectively, said lateral surfaces being located in planes substantially perpendicular to the shaft. The screening gap 20 has thus substantially radial direction. Furthermore, each rotor ring 27 has an inner diameter somewhat larger than that of the two adjacent stator rings 21 with the smallest diameter. Another screening gap 39 is thus formed, which is defined by the two opposite, concentric cylinder surfaces 40, 41 of the rotor ring 27 and stator ring 21, respectively. The direction of this additional passage is therefore axial.

In order to achieve a more favourable flow of the fiber suspension through the screening gaps 20, 39, the rotor rings 27 and stator rings 21 are bevelled to form release surfaces 42 and 43, respectively. Well diminished and well defined screening gaps are ensured in that the screening gaps 20, 39 are defined by opposite lateral surfaces 37, 38 and opposite cylinder surfaces 40, 41, respectively, i.e. a uniform width of the gap is obtained within determined tolerances. The axial screening gap 39 will have a constant width which is determined by the diameters of the rotor and stator rings 27, 21, and is established already when the rings are manufactured. The width of the radial screening gap 20 is determined by the pitch of the rings and can therefore be determined when the screening apparatus is assembled. With one and the same set of rotor and stator rings 27, 21, it is therefore possible to adjust the width of the screening gap as desired in each individual case. Furthermore, it is possible to adjust the radial gaps 20 manually, e.g. by applying one or more annular intermediate discs of predetermined thickness corresponding to the desired increase in the width of the screening gap, between the flange 29 and attachment ring 32 after having dismantled the screening apparatus. According to another valuable embodiment of the invention, the screening gaps can be adjusted by axial displacement of the rotor and stator in relation to each other. Suitable power transmission means are in this case connected to the rotor 19 or alternatively to the stator 18, in order to displace the actual screening member in the screening chamber 6 a limited distance corresponding to the desired increase or reduction in the width of the screening gap. Such adjustment may even be performed automatically during operation in order to clean the screening gaps if desired or in order to set a different operating width of the screening gaps. In the first case, the screening gaps are enlarged during a short period of time at regular intervals and then reduced to the predetermined operating width.

The width of the radial screening slot 20 may vary from 1 to 8 mm. The width of the axial screening slot 39 is in the range of 2 to 5 mm the magnitude of which thus must be determined when the rings 21, 27 are manufactured, whereas the width of the radial slot 20 can be determined and adjusted at assembly and may possibly be altered to another magnitude to be adjusted to different operating conditions.

The rings 27 of the rotor 19 in conjunction with the radial and axial screening gaps or slots 20, 39 are provided with cleaning means designed to produce turbulent flows in the screening gaps to prevent them from becoming clogged by fiber material. The rings 21 of the stator 18 are also provided with such cleaning means in conjunction with the radial and axial screening gaps 20, 39. In the embodiment shown these cleaning means comprise a plurality of radial grooves 44 and a plurality of axial grooves 45 in opposing surfaces 37, 38; 40, 41 of the stator and rotor rings 21, 27 at the radial screening gaps 20 and axial screening gaps 39, respectively. The cleaning means may also consist of ridges or bulges projecting from said surfaces and are thus located in the screening gaps 20, 39. Combinations of such cleaning ridges and grooves may also be used.

The rotor 19 is also provided with suitable rings 46 disposed on the four arms 30 and the largest of the rotor rings 27, in the plane of which the reject outlet 12 is located. The rings 46 help to feed the reject out of the outer screening space 13, through the outlet 12 with which they are aligned.

The partition 7 between the inject chamber 5 and screening chamber 6 is provided with an annular inlet opening 47 connecting the inject chamber 5 to the outer screening space 13 of the screening chamber 6.

The screening apparatus is also equipped with a separating means for removing undesired solid parts in the form of waste W from the fiber suspension, such as scrap, stones and sand. The separating means is rigidly mounted to the attachment ring 32 of the hub 33 to rotate as a unit together with the rotor 19. In the embodiment shown the separating means is a ring 48 having a plurality of substantially radially extending teeth 49. The teeth and the spaces therebetween allowing the fiber suspension through during rotation of the ring 48 are axially aligned with the annular inlet opening 47. The previously mentioned outlet 14 for solid parts, which is encountered by the rotating teeth 49, is located in the same plane as the ring 48 and on the underside of the housing 1.

The rotor 19, stator 18 and shaft 15 are suitably joined together to form a unitary assembly body which can be mounted into and dismantled from the housing 1.

According to a modified embodiment of the invention, the accept is removed at the other end of the screening apparatus instead of the end shown. In this case the accept outlet may be disposed radially in an added section containing an accept chamber communicating with the inner screening space 11 via an annular opening in the end wall 3 acting, as in the present case, as a partition, which is displaced a distance. The hub 33 can then be simplified, the openings 36 therein being eliminated and the shaft 15 being extended to pass through the entire screening apparatus and being journalled in the end wall 4. The embodiment shown can also be modified so that the shaft 15 and its drive means are disposed at the other end of the screening apparatus, in which case the accept outlet is moved and disposed as described above.

The screening apparatus can advantageously be arranged vertically so that the fiber suspension is influenced by gravity and the material which is unable to pass through the screening gaps is fed more easily down to the reject outlet.

During operation the fiber suspension is supplied under pressure to the outer screening space 13 and the finer portion will be pressed through the screening gaps 20, 39 to the inner screening space 11. The finer portion of fiber suspension will thus flow in the direction inwardly and not outwardly as is the case in screening apparatuses of the centrifugal type. Knots and large bundles of fibers will not therefore be influenced by the centrifugal force to collect at the entrance to the screening gaps 20, 39, but will rather move away from the gaps. Neither will knots be broken into small pieces which would otherwise contaminate the fiber suspension and accompany the finer portion. The rotor is driven at a speed sufficient to keep the screening gaps clear and open, e.g. about 1000 rpm or less for a pulp concentration of about 10-12%.

According to an alternative embodiment, the screening means may be cylindrical, in which case the rotor rings of equal diameter may be disposed to partially or completely cover the openings between the stator rings of equal diameter, or so that they each also partially cover at least one or the two adjacent stator rings. Depending on the arrangement selected, screening gaps will be formed between angular edges or axial surfaces of the rings or between bevelled surfaces formed at said angular edges. In these cases too it is possible to adjust the size of the screening gaps, except in the embodiment with the rotor ring covering both the adjacent stator rings.

The conical embodiment of the screening means shown is preferred since the conical screening members are easier to assemble and dismantle, the radial screening gaps can be formed by opposite lateral surfaces 37, 38 and the so well-defined screening gaps 20 can be advantageously altered to smaller or greater well-defined widths depending on different operating conditions.

With the expression "stationary screening member" it is thus contemplated that this screening member always is stationary in circumferential direction. However, in certain embodiments it can be axially displaced (see arrow "A" in FIG. 4) a very limited distance in order to increase or decrease the width of the screening gaps depending on altered operating conditions as described above, said slight axial displacement may be carried out during operation, or in order to rapidly and repeatedly increase and decrease the width of the gaps in order to clear them.

That which is claimed is:

1. An apparatus for screening a suspension of fibrous cellulose material containing undigested wood, said apparatus comprising a housing with a shaft rotating therein and an elongate screening means disposed in a screening chamber, said screening means comprising a stationary screening member and a rotation screening member connected to said shaft, each of said screening members comprising a plurality of parallel rings disposed with predetermined axial distance from each other to form circumferential openings, the rings of the stationary screening member and the rotating screening member being arranged to partially close each other's openings between the rings to defined circumferential screening gaps therebetween, said stationary screening member having the form of a unitary body rigidly connected to the housing so that at least circumferential movement is prevented, said rotating screening member having the form a unitary body connected to said shaft for common rotation therewith, said rotating screening member surrounds said stationary screening member, and said screening means separating the screening chamber into an outer screening space, which receives the fiber suspension to be screened, and an inner screening space, which receives the finer portion of the fiber suspension which passes through the screening gaps.

2. An apparatus as recited in claim 1 wherein said screening means is shaped as a truncated cone, the end with the smallest diameter being located nearest an inlet for the fiber suspension.

3. An apparatus as recited in claim 2 wherein said stationary screening member includes an assembly member in the form of a flange for its assembly in the screening chamber, said flange being disposed at the end of the screening member having the largest diameter and forming a support means for its rings together with a plurality of elongate connection elements distributed evenly around the circumference and secured to the inside of the screening member.

4. An apparatus as recited in claim 2 wherein said rotating screening member includes an assembly member in the form of a flange for its assembly on the shaft via an intermediate piece, said flange being disposed at the end of the screening member having the smallest diameter and forming a support means for its rings together with a plurality of elongate connection elements distributed evenly around the circumference and secured to the outside of the screening member.

5. An apparatus as recited in claim 4 wherein said intermediate piece comprises an annular attachment member and a hub secured to the shaft, said attachment ring being permanently joined to the hub and detachably joined to the flange of the rotating screening member.

6. An apparatus as recited in claim 5 wherein said hub has a rear portion extending from the shaft and provided with a plurality of openings which connect the inner screening space of the screening chamber with the outlet for the accept.

7. An apparatus as recited in claim 2 wherein each screening gap is defined by two opposite lateral surfaces of a ring of the stationary screening member and of a ring of the rotating screening member so that the screening gap will be substantially radially directed.

8. An apparatus as recited in claim 2 wherein each ring of said rotating screening member has an inner diameter somewhat larger than that of the two adjacent rings of the stationary screening member with the smallest diameter, in order to form an axially directed screening gap which is defined by two concentric cylinder surfaces of the ring of the rotating screening member and the ring of the stationary screening member.

9. An apparatus as recited in claim 7 wherein the width of the radial screening gaps is 1 to 8 mm.

10. An apparatus as recited in claim 8 wherein the width of the axial screening gaps is 2 to 5 mm.

11. An apparatus for screening a suspension of fibrous cellulose material containing undigested wood, said apparatus comprising a housing with a shaft rotating therein and an elongate screening means disposed in a screening chamber, said screening means comprising a stationary screening member and a rotating screening member connected to said shaft, each of said screening members comprising a plurality of parallel rings disposed with predetermined axial distance from each other to form circumferential openings, the rings of the stationary screening member and the rotating screening member being arranged to partially close each other's openings between the rings to define circumferential screening gaps therebetween, said stationary screening member having the form of a unitary body rigidly connected to the housing so that at least circumferential movement is prevented, said rotating screening member having the form of a unitary body connected to said shaft for common rotation therewith, and said screening gaps are provided with cleaning means arranged to produce turbulent flows in the screening gaps during rotation of the rotating screening member, said cleaning means comprising a plurality of radial grooves or ridges and a plurality of axial grooves or ridges in opposing surfaces of the stationary and rotating rings at the radial screening gaps and axial screening gaps, respectively.

* * * * *